Aug. 17, 1937.  E. J. WITCHGER  2,090,495
SURFACE TEST INDICATOR
Filed Jan. 19, 1935
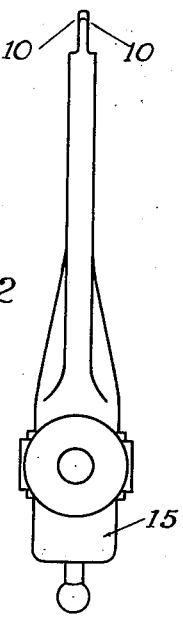
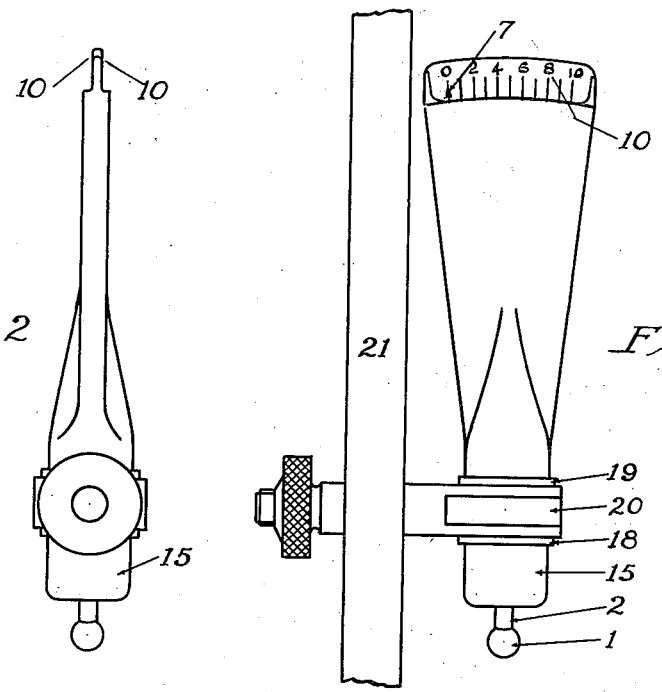
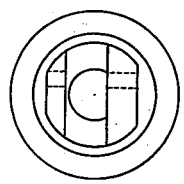
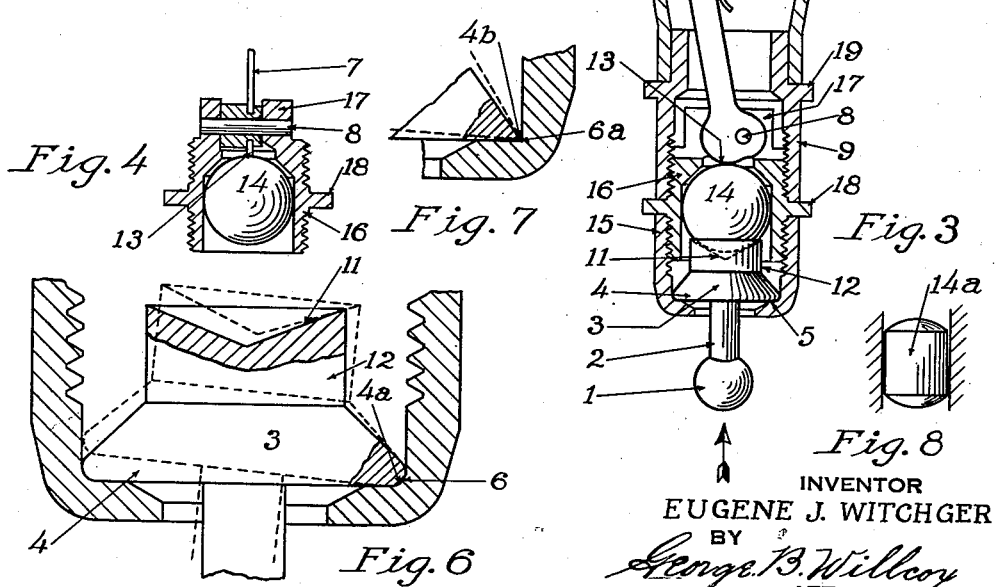
INVENTOR
EUGENE J. WITCHGER
BY
George B. Willcox
ATTORNEY Patented Aug. 17, 1937

2,090,495

UNITED STATES PATENT OFFICE 2,090,495

SURFACE TEST INDICATOR

Eugene J. Witchger, Saginaw, Mich., assignor to The Lufkin Rule Company, Saginaw, Mich., a corporation of Michigan Application January 19, 1935, Serial No. 2,455

3 Claims. (Cl. 33—172)

This invention relates to surface test indicators that operate by single offset contact to locate irregularities in surfaces, either plane or curved, and to indicate such irregularities on an enlarged scale.

A test indicator of that class includes as its necessary elements; a surface contactor, being usually a knob fixed to the end of a stem which is mounted on a pintle; an oscillating pointer; and amplifying means operative between the contactor and pointer to move the pointer proportionally when the contactor is rocked on its pintle. A contactor that is mounted on a pintle as above described can only operate properly when its rocking movements take place in a plane which is assumed perpendicular to the work surface. Considerable care is required in setting an instrument of that kind, either to make it test accurately, or to get the scale into a position for convenient reading.

Sometimes such indicators have in part overcome that disadvantage by so mounting the rockable contactor that it could be rotated coaxially with the longitudinal axis of the instrument, thereby enabling its pintle to be set to oscillate in a plane perpendicular to the work surface.

An object of the present invention is to provide a contactor which is distinguished from those earlier devices in several important respects and overcomes their deficiencies. It is always ready to accurately test a work surface when presented to it from any suitable angle of approach, without any preliminary setting or adjustment of the contactor either by rotation on the housing of the instrument or otherwise. Furthermore, this instrument makes accurate indications even when the contactor stem is directed squarely against the work surface so that its movement is not by the usual rocking action, but is in a straight line in the direction of its own length, this being a mode of operation impossible in the earlier instruments above mentioned.

Also, my invention is in the nature of new and advantageous means whereby all displacements of the contactor, rectilinear as well as rocking, are accurately transmitted to the oscillating pointer.

Other objects and advantages will be in part obvious and in part pointed out hereinafter. The invention accordingly comprises the elements and combination of elements, features of construction and arrangement of parts which will be exemplified in the structure hereinafter described as a preferred form, and the scope of the invention will be indicated in the claims.

In the accompanying drawing, in which a preferred embodiment of the claimed subject matter is illustrated, Fig. 1 is a face view of an instrument embodying my invention equipped with an arm for adjustably mounting it.

Fig. 2 is a side view of the same with the arm removed.

Fig. 3 is a part longitudinal section through the tubular barrel of the housing.

Fig. 4 is a sectional detail of the thimble, the thrust ball and the pivotal mounting for the pointer.

Fig. 5 is a top plan view of the thimble.

Fig. 6 is an enlarged detail of the tiltable fulcrum ring, its seat and associated parts.

Fig. 7 is a fragmentary detail of a modified structure for the fulcrum ring.

Fig. 8 is a detail view of an alternative form of the thrust member.

Similar reference characters indicate corresponding parts throughout the several views of the drawing.

Referring now more particularly to Fig. 3, there is indicated at numeral 1 a contactor knob fixed to a stem 2. The stem is fixed to a disk-like member 3 whose circular peripheral rim portion 4 normally rests closely in an annular seat 5 in the tubular barrel of the housing, but is tiltable about points on its peripheral edge. Since the rim portion 4 of member 3, in association with contactor 1, 2, and co-operating flat annular seat 5, or their equivalents, are essential elements of my invention, part 4 will be designated by the term "fulcrum ring" in order to emphasize its new and useful tiltable characteristics in that association, and for purposes of description the fulcrum ring may be considered as being secured coaxially with and in a plane at right angles to the stem.

Contactor 1, if displaced in a direction lengthwise of the axis of the instrument as indicated by the arrow, Fig. 3, lifts the fulcrum ring 4 from its seat 5, but when the contactor is displaced laterally in any of the many possible directions, fulcrum ring 4 tilts about some fulcrum point on the seat, as is indicated by dotted lines in Figs. 6 and 7. The cross-sectional shape of ring 4 may be round, as shown at 4a, Fig. 6, to fit a concave filet 6 on seat 5, or else, as shown in Fig. 7, the ring may be sharp-edged as at 4b so as to fulcrum in the sharp corner 6a of the seat.

The indicating means is preferably the usual cam-actuated pointer 7 pivotally mounted at 8 in the tubular barrel 9 of the housing and is movable across a graduated scale 10 to point out the actual and relative magnitudes of the surface irregularities in the work piece as they are encountered by contactor 1. After having been displaced from its initial or zero position the pointer and associate parts are returned by means of a spring 7a.

A linkage connects contactor 1 and pointer 7 and as it embodies certain novel and preferred features of construction it will now be described. The linkage shown in Fig. 3 consists of elements that co-operate in translating small movements of the contactor into amplified indications by the pointer. These co-operative elements of the linkage are, a cam-like structure formed to present a surface of revolution such as the cup or recess 11 defined by substantially cone-shaped walls, and a raised boss 12, coaxially located on the fulcrum ring disk 3; a cam-like eccentric conformation 13 on the pivoted end of pointer 7; and a longitudinally movable thrust-action member such as the ball 14 of Fig. 3, or the round-ended plunger 14a, Fig. 8, interposed between the two cam-like members 11 and 13.

An angle of inclination of the walls of the cone-shaped depression 11 is selected which will compensate for the aberrational effect produced on thrust member 14 by the combined tilting and lifting movements designated by dotted lines in Fig. 6, of fulcrum ring 4, boss 12 and cam 11.

It may be stated here that in practice, when the walls of this cup-shaped depression 11 are sloped downward from its rim to its center at an angle of approximately 22-degrees from the horizontal, and the diametral distance between the top and bottom spherical surfaces of thrust member 14 or 14a is two-tenths of an inch, while the diameter of the fulcrum ring 4 is one-fourth of an inch and the diameter of the boss 12 is fifteen hundredths of an inch, and the distance from the base of the fulcrum ring 4 to the top of the boss 12 is fourteen hundredths of an inch, then the proportions of the associated parts are such that the pointer gives correct readings throughout its range. The foregoing particulars as to size and proportions of the parts are recited to enable those skilled in the art to reproduce without experimentation the embodiment of the invention herein illustrated, but that explanation is not intended to be construed as being a definition limiting the scope of the novel features herein described and claimed, further than they may be limited by disclosures in the prior art.

The thrust member 14 may be a metal ball, as shown in Figs. 3 and 4. However, member 14 may have its upright sides shaped like a cylinder as at 14a, Fig. 8.

The tubular barrel 9 of the housing has a cap 15 and a thimble 16 which screw-connects the cap to the barrel, its threaded ends projecting part way into each. The thimble is bored to slidingly receive thrust member 14 and has upwardly projecting lugs 17 that carry the pivot 8 of pointer 7. There is an outwardly projecting annular flange 18 on thimble 16 intermediate its threaded end portions and projecting like an external ring or collar from between the ends of barrel 9 and cap 15. At the upper end of the barrel is a similar flange 19. Between flanges 18 and 19 is presented a cylindrical bearing surface which is gripped by a suitable clamping device 20, Fig. 1, of known design, mounted on an arm 21 that keeps the instrument in a fixed position while in use.

When the instrument is in operation, assuming that the work piece to be tested has been mounted in a turning machine and the arm 21 has been clamped in a steady rest so that the contactor knob 1 of the instrument touches the work surface, it is then a matter of indifference whether the instrument has been presented to the work with the end of the contactor engaging the work piece end-on or perpendicularly, or whether a side of the contactor knob is presented to the face of the work, and if presented sidewise it is immaterial at what angle. According to my invention the application of the contactor to the work can be made from so many directions that the whole testing instrument may well be termed universal, in the sense that the instrument can be placed so that the indicating dial can be faced in whatever direction happens to be most convenient for observing its readings.

The user need not make any preliminary adjustment or setting of the contactor, as in earlier instruments. My improvement provides an indicator for all kinds of surface testing work that is accurate, convenient, reliable and satisfactory in use, and is relatively inexpensive to manufacture.

By the means herein described I have solved the problem of how to provide in a surface test indicator a contactor arranged and operating so that it will produce readings of dependable accuracy whenever the contactor is displaced in any sidewise direction or whenever it is displaced in the direction of its own length. I have arrived at that solution by applying the general principle of the fulcrum ring, and by selecting the novel means herein shown as being used in solving the problem.

Having thus described my invention, what I claim and desire to secure by Letters Patent is:

1. In a surface test indicator having a housing and including a pivotally mounted pointer and a work contactor having a stem, in combination, a disk-like member fixed to said stem and having a circular peripheral rim, an annular flat seat in the end of said housing surrounding closely the outer periphery of said rim and upon which the rim is tiltable; a raised boss carried by the stem adjacent the rim, an end of said boss being formed with a downwardly concave recess; a thrust member having a rounded end portion seated in said recess; and means actuated by said thrust member arranged and adapted to oscillate said pointer proportionally to any tilting movements imparted to said rim.

2. In a surface test indicator having a housing and a reading scale; an internally threaded tubular barrel on said housing, a threaded cap for said barrel, a thimble enclosed within and uniting said barrel and cap, a flat circular seat in the end of said cap, a contactor projecting through said circular seat, a disk-like member having a circular peripheral rim normally resting flatwise on said seat, a cone-like depression in said disk-like member adjacent said rim, a thrust member movably received in said thimble and seated in said depression, and an indicator for said scale operatively engaged by said thrust member.

3. In a surface test indicator including a housing, a pivotally mounted pointer, a work contactor and a thrust-transmitting element interposed operatively between said pointer and contactor; in combination, a disk-like member secured to said contactor and having a circular peripheral rim, an annular seat normally in face-to-face engagement with said rim, said seat being located in an end of said housing and surrounding said rim to constrain the same against sidewise displacement, portions of the periphery of said rim in engagement with said seat constituting fulcrums about which the disk-like member is tiltable upon lateral displacement of the contactor.

EUGENE J. WITCHGER.